United States Patent
Bahl et al.

(10) Patent No.: US 6,800,962 B2
(45) Date of Patent: Oct. 5, 2004

(54) METHOD AND APPARATUS FOR FORCED CURRENT SHARING IN DIODE-CONNECTED REDUNDANT POWER SUPPLIES

(75) Inventors: Erik Stefan Bahl, Huntsville, AL (US); John S. McGary, Petersburg, TN (US); Jason P. Lyon, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 216 days.

(21) Appl. No.: 10/050,642

(22) Filed: Jan. 16, 2002

(65) Prior Publication Data

US 2003/0132669 A1 Jul. 17, 2003

(51) Int. Cl.[7] .............................................. H02M 3/335
(52) U.S. Cl. ............................ 307/52; 363/65; 323/272
(58) Field of Search ..................................... 307/44, 52

(56) References Cited

U.S. PATENT DOCUMENTS

| | | | |
|---|---|---|---|
| 4,628,433 A | | 12/1986 | Notohamiprodjo ............ 363/65 |
| 4,658,201 A | * | 4/1987 | Notohamiprodjo ........... 323/224 |
| 4,860,188 A | * | 8/1989 | Bailey et al. .................. 363/65 |
| 4,866,295 A | * | 9/1989 | Leventis et al. ............... 307/43 |
| 5,157,269 A | | 10/1992 | Jordan et al. ................... 307/59 |
| 5,550,461 A | | 8/1996 | Pouzoullic .................... 323/269 |
| 5,784,626 A | * | 7/1998 | Odaohara ....................... 307/66 |
| 5,796,274 A | * | 8/1998 | Willis et al. ................... 307/44 |
| 5,834,925 A | | 11/1998 | Chesavage .................... 323/272 |
| 5,860,188 A | | 1/1999 | Maurer et al. ................. 363/65 |
| 5,894,413 A | | 4/1999 | Ferguson ....................... 363/65 |
| 6,144,115 A | * | 11/2000 | Massie et al. .................. 307/80 |
| 6,208,039 B1 | * | 3/2001 | Mendelsohn et al. .......... 307/52 |
| 6,253,330 B1 | * | 6/2001 | Denkin et al. ................. 307/52 |
| 6,275,958 B1 | | 8/2001 | Carpenter et al. ............. 714/48 |
| 6,414,469 B1 | * | 7/2002 | Zhou et al. ................... 323/272 |
| 6,420,906 B1 | * | 7/2002 | Kohda .......................... 326/114 |
| 6,462,926 B1 | * | 10/2002 | Zaretsky et al. ............. 361/103 |
| 6,608,396 B2 | * | 8/2003 | Downer et al. ................ 307/45 |
| 6,608,402 B2 | * | 8/2003 | Soo et al. ...................... 307/52 |

* cited by examiner

*Primary Examiner*—Brian Sircus
*Assistant Examiner*—Roberto J. Rios
(74) *Attorney, Agent, or Firm*—Allen, Dyer, Doppelt, Milbrath & Gilchrist, P.A.

(57) ABSTRACT

A power supply system has redundant regulated power supplies, whose output ports are diode-ORed to an output node. One of the power supplies outputs a regulated output voltage that is sufficient to meet current demand of a load coupled to the output node. Each power supply has an associated monitoring circuit that monitors the voltage drop across its OR-ing diode. The monitoring circuit for a non-dominant power supply controls its operation so that the non-dominant supply provides a reduced current through its diode to the output node that is less than the current demand of the load, but sufficient to forward bias the diode, and thereby enable the non-dominant supply to immediately respond to a load change, such as an interruption in the operation of the dominant power supply.

5 Claims, 2 Drawing Sheets

METHOD AND APPARATUS FOR FORCED CURRENT SHARING IN DIODE-CONNECTED REDUNDANT POWER SUPPLIES

FIELD OF THE INVENTION

The present invention relates in general to power supply circuits, such as those employed in telecommunication circuit applications, and is particularly directed to a feedback control mechanism for a diode-ORed, redundant power supply system, that effectively 'forces' the non-dominant power supply to continuously share a portion of the load current, and thereby enables the non-dominant power supply to immediately respond to a load change, such as an interruption in the operation of the dominant power supply.

BACKGROUND OF THE INVENTION

Designers of power supplies for electronic equipment currently face two significant problems: decreasing voltage requirements and redundancy. The first is due to the fact that, as electronic equipment has become more complex, the industry has been steadily migrating to lower operating voltages in order to reduce power consumption. The second is based upon the need to make this complex equipment more robust than its predecessors. Robustness comes in the form of redundant systems, such as back-up power supplies.

More particularly, back-up power supplies must be designed so that, in the event of a primary supply failure, the back-up or auxiliary power supply will immediately take over without causing an interruption in operation of the circuit being powered. This is especially true in the communications industry, whose products, such as subscriber line interface circuits or 'SLIC's, are required to conform with a very demanding performance specification, including accuracy, insensitivity to common mode signals, linearity, low noise, filtering, ease of impedance matching programmability, and low power consumption.

Moreover, as designers of integrated circuits employed for digital communications, such as codecs and the like, continue to 'lower the voltage supply rail bar' requirements for their devices (e.g., from five volts down to three volts and below), not only is the communication service provider faced with the problem that such low voltage restrictions may not provide sufficient voltage headroom to provide a low impedance-interface with its existing SLICs (which may be designed to operate at a VCC supply rail of five volts), but the power supply employed must conform with very exacting requirements.

The trend of decreasing output voltages has thus increased the design difficulty. A five volt power supply that is required to maintain a five volt output within a five percent tolerance means that it can swing 250 mV in either direction and still 'meet spec'. In contrast, a two volt power supply that is required to maintain the same five percent tolerance is allowed to vary only 100 mV in either direction. Obviously, this problem becomes exacerbated as circumstances call for even tighter tolerances and lower voltages.

In the case of redundant power supplies, two or more power supplies are connected in parallel, for example, by means of a relatively common technique called diode-O-Ring, diagrammatically illustrated in FIG. 1, so that if one power supply fails, the other supply will take up the load without causing system shutdown. To this end, the redundant supply of FIG. 1 has a first power supply (P.S.) 1, that produces an output voltage V1, while a second power supply 2 produces an output voltage V2. The two power supplies are connected to an output bus 3 through associated ORing-diodes 4 and 5, respectively, through which currents $I_1$ and $I_2$ flow to a node 6—the point from which an output voltage V3 to a load is supplied.

Typically, the output voltage will vary somewhat from supply to supply, with component tolerances, so that in a redundant arrangement such as shown in FIG. 1, that power supply having the higher reference voltage $V_{REF}$ will supply most of the load current $I_L$. Since the voltage drop across a diode is directly proportional to the current flowing through it, then whichever power supply is sourcing the most current will produce the larger diode drop. On the other hand, the power supply having the lower reference voltage will have a lower output voltage, and supply less current, producing a lower diode voltage drop. With the two power supplies diode-ORed together, equilibrium is quickly reached and each power supply provides some percentage of the current—provided that the voltage reference differential between the two supplies can be accommodated by the diode voltage drop.

A power supply's output voltage should not have a large dependence on its output current load. However in the diode-ORing case, the output voltage V3 is dependent on the load or output current $I_L$. In addition, since the voltage drop across the ORing-diode is also dependent on the output current, the output voltage V3 can be hard to predict and regulate. To accommodate this problem, power supplies generally employ some form of closed-loop control that senses the output voltage. This information is fed back to the power supply's controller and compared to an internal voltage reference, so that the controller may regulate the supply's output voltage at a constant voltage under different conditions.

In the power supply architecture of FIG. 1, voltage feedback (F.B.) is supplied to reference inputs REF 1, REF 2 from the upstream (V1 and V2) sides of the ORing-diodes 4 and 5, so that the power supplys' controllers have no information about diode voltage drops. As a result, the output node voltage V3 is subject to the unpredictable voltage drops across the diodes. It is preferred to feed back the voltage from the downstream or V3 side of the ORing-diodes, as shown in FIG. 2, since this is the actual voltage that is being supplied to the load. With the voltage feedback point at the V3 side of the ORing-diodes, the voltage drops across the diodes are no longer a problem, and the power supply with the larger reference voltage will establish the output voltage V3.

On the other hand, the power supply with the lesser reference voltage will turn off, since its feedback exceeds its reference, so that all of the voltage to the load is sourced from the power supply having the higher reference voltage. Therefore, if the active (higher reference voltage) power supply fails suddenly, the inactive supply will be unable to start up immediately, resulting in an interruption in supply voltage to the output node, and likely disruption in the operation of downstream electronic circuitry.

SUMMARY OF THE INVENTION

In accordance with the present invention, shortcomings of conventional diode-ORed, redundant power supply systems, such as those described above, are effectively obviated by a new and improved feedback control mechanism that forces the non-dominant or 'backup' power supply to share a (relatively small) portion of the load, which is effective to eliminate the shut off problem when regulating from the load
} side of the ORing diodes. The regulation control mechanism employed by the invention involves two functional components. The first is to allow regulation on the common output bus of both power supplies. By regulating the voltage on the common output bus, the tolerance error added by the ORing diode is eliminated. The second is to force the non-dominant power supply to share a portion of the load current.

For this purpose, a voltage monitor circuit is coupled across each output-ORing diode. Each monitor circuit measures the voltage drop ($V_d$) across its associated diode and compares the measured voltage to a prescribed minimum or threshold value. The result of the comparison is then fed back via a summing circuit to the control port of the power supply. If the diode voltage drop $V_d$ as measured by a respective monitor circuit is larger than the minimum value, it is inferred that its power supply is supplying an acceptable portion of the load current to the output node, and the monitor circuit produces a first output value (e.g., a logical high) at its output port.

In response to this output from the monitor circuit, the power supply controller continues to regulate the supply's output voltage at its present value and the monitor circuit is dormant. However, if the value of the monitored diode voltage $V_d$ drops below its preset minimum value, it is inferred that the other power supply is supplying the entirety of the load current. This causes the output of the monitor circuit to change state, which causes the power supply's controller to increase the output voltage and forward bias the monitored diode. This effectively 'forces' the non-dominant power supply to share a portion of the load current, and thereby continuously maintains the non-dominant power supply in a ready-to-go state, so that it can immediately respond to a load change. The monitor circuit also compares the power supply voltage with a further reference voltage, to insure that the power supply output voltage will not rise above a desired maximum.

DETAILED DESCRIPTION

Figure 1:
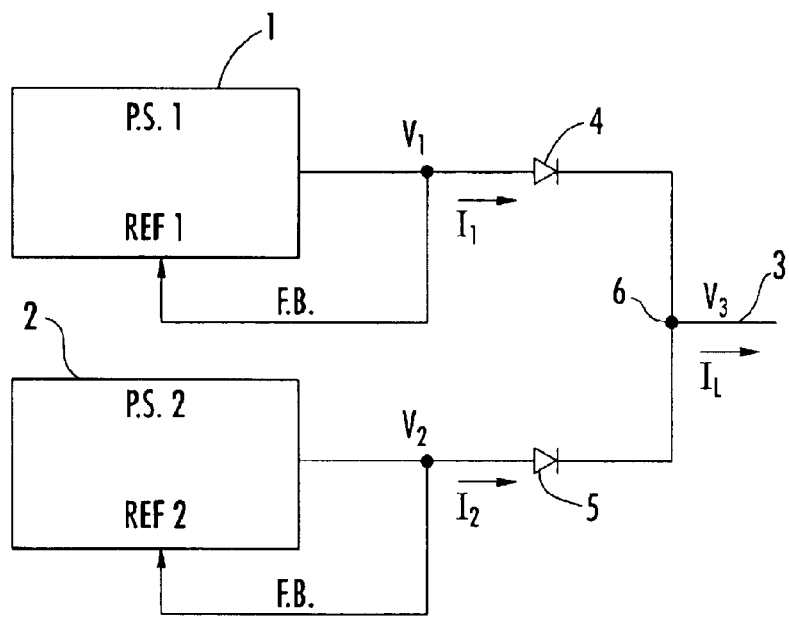
FIG. 1 diagrammatically illustrates a conventional diode-ORed redundant power supply arrangement, in which voltage feedback takes place from the upstream sides of the ORing-diodes.

Before detailing the forced current-sharing, diode-connected redundant power supply architecture of the present invention, it should be observed that the invention resides primarily in a prescribed arrangement of conventional power supply circuit components and regulation circuitry therefor, that controls the operations of such components. Consequently, the configuration of such components and the manner in which they may be interfaced with power circuits, such as telecommunication equipment, have, for the most part, been shown in the drawings by readily understandable block diagrams, which depict only those specific details that are pertinent to the present invention, so as not to obscure the disclosure with details which will be readily apparent to those skilled in the art having the benefit of the description herein. Thus, the block diagrams of the Figures are primarily intended to show the major components of the invention in convenient functional groupings, so that the invention may be more readily understood.

Figure 2:
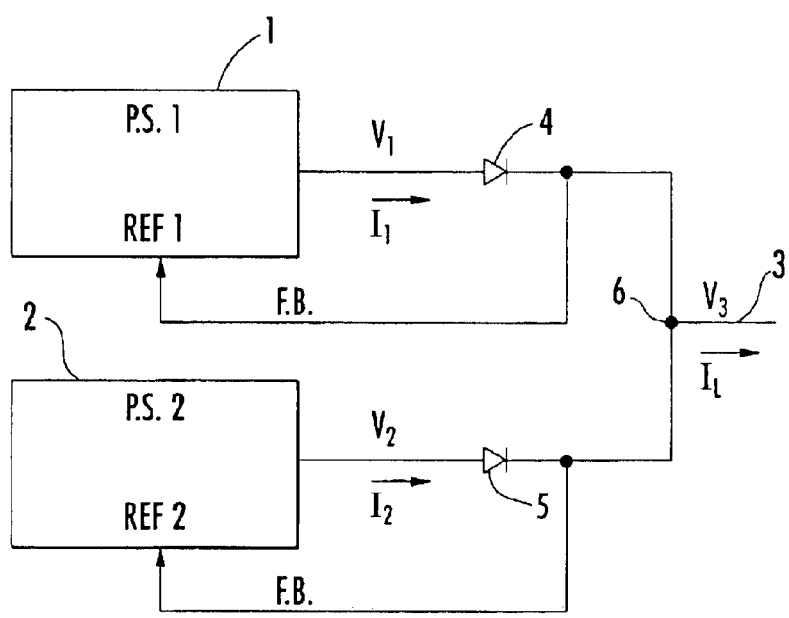
FIG. 2 diagrammatically illustrates a conventional diode-ORed redundant power supply arrangement, in which voltage feedback takes place from the downstream sides of the ORing-diodes.
Figure 3:
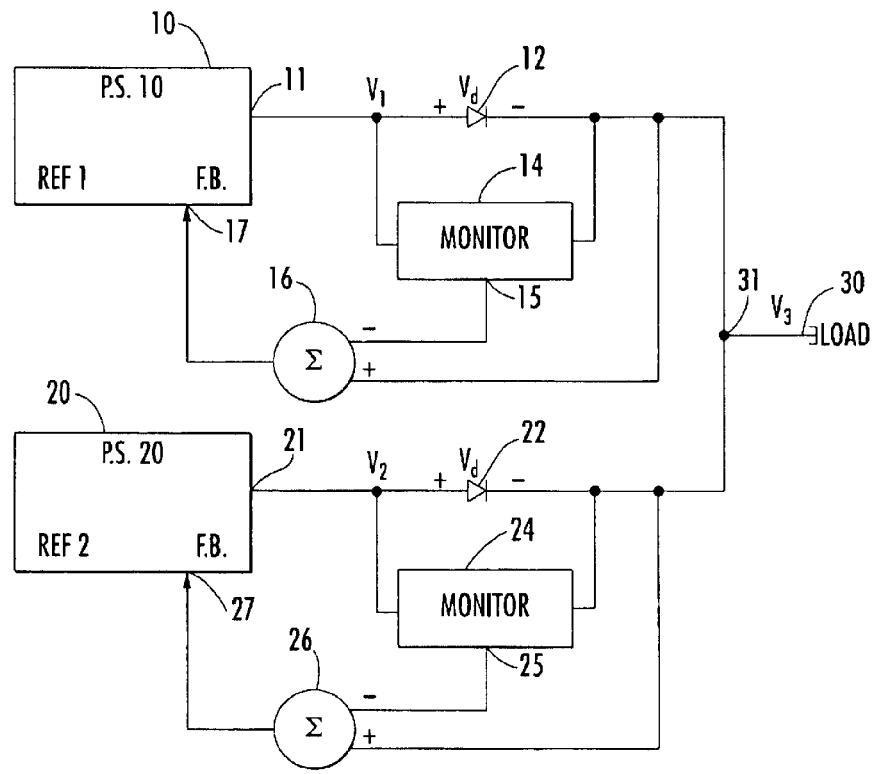
FIG. 3 diagrammatically illustrates the forced current-sharing, redundant diode-connected power supply architecture of the present invention.

Attention is now directed to FIG. 3, wherein a non-limiting, but preferred embodiment of the forced current-sharing, redundant diode-connected power supply architecture of the present invention is diagrammatically illustrated as comprising a first power supply 10 having an output port 11 producing an output voltage V1, and a second power supply 20 having an output port 21 that produces an output voltage V2. As in the designs of FIGS. 1 and 2, the supply 10 is connected to a common node 31 of an output bus 30 through a first ORing-diode 12, while power supply 20 is connected to output bus node 31 through a second ORing-diode 22.

In accordance with the invention, a first voltage monitor circuit 14 is coupled across diode 12, while a second voltage monitor circuit 24 is coupled across diode 22. Each monitor circuit (to be described in detail with reference to FIG. 4) is operative to measure the voltage drop ($V_d$) across its associated ORing-diode and then compare the measured voltage to a prescribed minimum value. The result of the comparison is then fed back via a summing circuit to the control port of the power supply. For this purpose, monitor circuit 14 has its comparison output 15 coupled to a summing circuit 16, which is also coupled to the common node 31. The output of the summing circuit 16 is coupled to control port 17 of power supply 10. Similarly, monitor circuit 24 has its comparison output 25 coupled to a summing circuit which is also coupled to the common node 31. The output of the summing circuit 26 is coupled to control port 27 of power supply 20.

If the diode voltage drop $V_d$ as measured by a respective monitor circuit is larger than the minimum value, it is inferred that its power supply is supplying an acceptable portion of the load current to the output node 31, and the monitor circuit produces a first output value (e.g., a logical high) at its output port. In response to seeing this output from the monitor circuit, the power supply controller continues to regulate the supply's output voltage at its present value and the monitor circuit is dormant. However, if the value of the monitored diode voltage $V_d$ drops below its preset minimum value, it is inferred that the other power supply is supplying the entirety of the load current. This causes the output of the monitor circuit to change state (e.g., goes low), which forces the power supply's controller to increase the output voltage and forward bias the monitored diode. This effectively 'forces' the non-dominant power supply to share a portion of the load current, and thereby continuously maintains the non-dominant power supply in a ready-to-go state, so that it can immediately respond to a load change.

Figure 4:
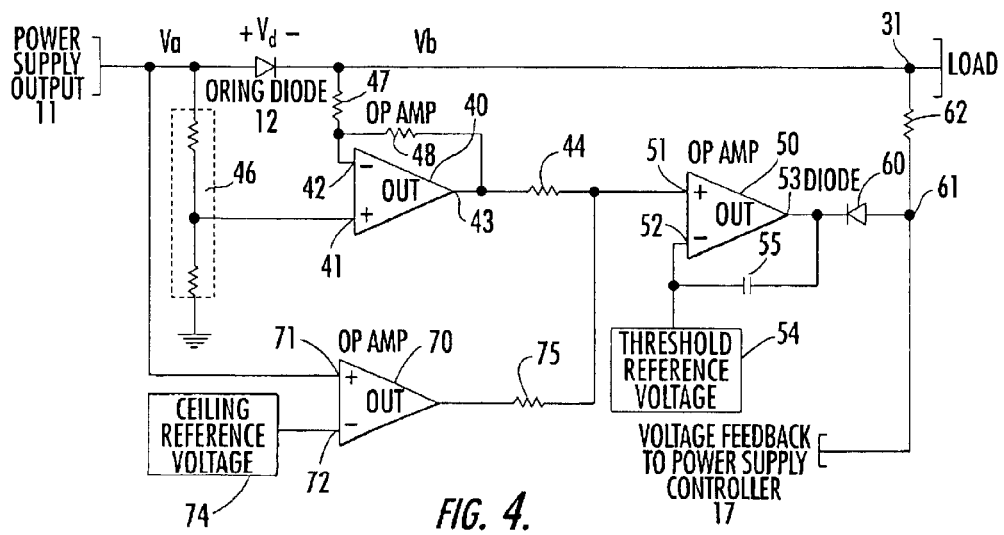
FIG. 4 shows the configuration of a respective monitor circuit of the forced current-sharing, redundant diode-connected power supply architecture of FIG. 3.

FIG. 4 shows the configuration of each of the monitor circuits 14 and 24. For purposes of simplifying the present description, only monitor circuit 14 will be detailed, it being understood that the present description applies equally to the monitor circuit 24 of FIG. 3. In order to measure the voltage drop $V_d$ across diode 12 a first operational amplifier 40 has its non-inverting (+) input 41 coupled via a voltage divider 46 (referenced to ground) to monitor the voltage Va at the upstream (anode) side of ORing diode 12, and its inverting (−) input 42 coupled via a resistor 47 to monitor the voltage Vb at the downstream (cathode) side of ORing diode 12. A feedback resistor 48 is coupled between the output 43 and inverting input 42 of operational amplifier 40.

The output 43 of operational amplifier 40 is coupled through a summing resistor 44 to the non-inverting (+) input 51 of a second operational amplifier 50 configured as a threshold detector. For this purpose, operational amplifier 50 has its inverting (−) input 52 coupled to a reference voltage 54. An integrating capacitor 55 is coupled between the output 53 and inverting input 52 of the amplifier 50, and serves to provide a smooth transition between a change in the output state of threshold detector 50. The output 53 of threshold detector 50 is coupled through a diode 60 to a summing circuit node 61, which is also coupled through a resistor 62 to output node 31.

The monitor circuit further includes a second threshold detector having its non-inverting input 71 coupled to the power supply output 11, and its inverting (−) input 72 coupled to receive a reference voltage 74. The output 73 of threshold detector 70 is coupled through a summing resistor 75 to the non-inverting (+) input 51 of threshold detector 50. As will be described, this additional threshold detector is used to insure that the output voltage will not rise above a desired maximum output voltage.

In operation, the voltage drop $V_d$=Va−Vb across diode 12 is amplified by amplifier 40 and compared in threshold detector 50 to a reference voltage 54. If the output voltage of amplifier 40 A is above the reference voltage 54 then the output of the threshold detector 50 will have a first state (e.g., high), so that diode 60 will be back-biased and the monitor circuit will have no interaction with the operation of the power supply controller, as its monitors the output voltage applied to node 31. However, if the voltage at the output 43 of amplifier 40 drops below the reference voltage 54, the output of threshold detector 50 will have a second state (e.g., low), so as to forward bias diode 60, and cause a reduction in the voltage being fed back to the power supply controller.

As pointed out above, this reduction of the controller feedback voltage effectively 'forces' the power supply's controller to increase the output voltage sufficiently to maintain current flow in the ORing-diode 12, and thereby keep the non-dominant power supply in a 'slightly' on or 'forced current-sharing' condition, that enables it to immediately respond to a load change, such as an interruption in the operation of the dominant power supply.

The threshold detector 70 compares the power supply output voltage Va with the reference voltage 74. As long as the power supply output voltage Va is not higher than the reference voltage 74, the output of threshold detector 70 is low, the 'forced current-sharing' operation of the monitor circuit proceeds as described above. However, if the power supply output voltage Va exceeds the reference voltage 74, the output of threshold detector 70 goes high. This forces the output of threshold detector 50 high, so as to return control of the power supply to the controller, to regulate the power supply's output voltage based solely on the controller reference voltage 54.

As will be appreciated from the foregoing description, shortcomings of conventional diode-ORed, redundant power supply systems, enumerated above, are effectively obviated by the current-sharing feedback control mechanism of the present invention that forces the non-dominant power supply to share a portion of the load current, so that it can immediately respond to a load change, such as an interruption in the operation of the dominant power supply.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A method of supplying power to a load comprising the steps of:
   (a) coupling output ports of a plurality of power supplies to an output node that is arranged to be coupled to said load;
   (b) controlling one of said power supplies so as to supply to said output node a regulated output voltage that is sufficient to meet current demand of said load; and
   (c) controlling another of said power supplies so as to cause the continuous flow of a reduced current therefrom to said output node less than said current demand of said load without an interruption in the continuous supply of current to said load, but sufficient to enable said another power supply to supply said output voltage that is sufficient to meet said current demand of said load in the event of an inability of said one of said power supplies to supply said regulated output voltage that meets said current demand of said load; and wherein
   step (a) further comprises coupling the output port of said another of said plurality of power supplies to said output node through a diode, and wherein step (c) further comprises controlling said reduced continuous current flow from said another of said plurality of power supplies to said output node in accordance with the voltage drop across said diode, and
   step (c) further comprises coupling a voltage drop across said diode to an operational amplifier circuit that is configured to compare said voltage drop with a prescribed voltage reference and, in response to said voltage drop being less than said reference voltage, supplying a feedback-control signal to said another of said power supplies that is effective to increase its output voltage sufficiently to forward bias said diode; and further including the step of:
   (d) comparing the voltage at the output port of said another of said plurality of power supplies with a further reference voltage and, in response to said voltage exceeding said further reference voltage, controlling said feedback signal so that the output voltage of said another of said plurality of power supplies is regulated in accordance with the voltage at said output node.

2. A method of supplying power to a load comprising the steps of:
   (a) diode-ORing output ports of redundant regulated power supplies to an output node that is arranged to be coupled to said load, so that one of said redundant regulated power supplies provides said output node with a regulated output voltage that is sufficient to meet current demand of said load; and
   (b) monitoring the voltage drop across a diode that diode-ORs the output port of another of said redundant regulated power supplies to said output node, and providing a reduced continuous current flow from said another of said redundant regulated power supplies through said diode to said output node in accordance with the monitored voltage drop across said diode so as to enable said another of said redundant regulated power supplies to supply said regulated output voltage that is sufficient to meet the current demand of said load without an interruption in the supply of current to said load in the event of an inability of said one of said redundant regulated power supplies to supply a regulated output voltage that meets the current demand of said load; and wherein step (b) further comprises coupling a voltage drop across said diode to an operational amplifier circuit that is configured to compare said voltage drop with a prescribed voltage reference and, in response to said voltage drop being less than said reference voltage, supplying a feedback control signal to said another of said redundant regulated power supplies that is effective to increase its output voltage sufficiently to forward bias said diode; and further including the step of:

(c) comparing the voltage at the output port of said another of said redundant regulated power supplies with a further reference voltage and, in response to the voltage at the output port of said another of said redundant regulated power supplies exceeding said further reference voltage, controlling said feedback signal so that the output voltage of said another of said redundant regulated power supplies is regulated in accordance with the voltage at said output node.

3. A power supply system comprising redundant regulated power supplies, outputs of which are diode-ORed to an output node arranged to be coupled to a load, with one of said redundant regulated power supplies outputting a regulated output voltage that is sufficient to meet current demand of said load, each power supply having an associated monitoring circuit that monitors the voltage drop across its OR-ing diode, and wherein the monitoring circuit for another of said redundant regulated power supplies, other than said one of said redundant regulated power supplies, controls its operation so that said another power supply provides a reduced continuous current flow through its diode to said output node that is less than the current demand of the load, but is sufficient to continuously forward bias said diode so as to enable said another of said redundant regulated power supplies to supply said regulated output voltage that is sufficient to meet the current demand of said load without an interruption in the supply of current to said load in the event of an inability of said one of said redundant regulated power supplies to supply a regulated output voltage that meets the current demand of said load, and wherein said monitoring circuit for another of said redundant regulated power supplies comprises an operational amplifier circuit coupled to compare a voltage drop across said diode with a prescribed voltage reference and, in response to said voltage drop being less than said reference voltage, to supply a feedback control signal to said another of said redundant regulated power supplies that is effective to increase its output voltage sufficiently to forward bias said diode; and wherein said operational amplifier circuit is further coupled to compare the voltage at the output port of said another of said redundant regulated power supplies with a further reference voltage and, in response to the voltage at the output port of said another of said redundant regulated power supplies exceeding said further reference voltage, to control said feedback signal so that the output voltage of said another of said redundant regulated power supplies is regulated in accordance with the voltage at said output node.

4. A system for supplying power to a load comprising:

redundant regulated power supplies having output ports thereof diode-ORed to an output node that is arranged to be coupled to said load, one of said redundant regulated power providing said output node with a regulated output voltage that is sufficient to meet current demand of said load; and a circuit coupled to monitor the voltage drop across a diode which diode-ORs the output port of another of said redundant regulated power supplies to said output node, and being operative to control the operation of said redundant regulated power supplies, so as to provide a reduced continuous current flow from said another of said redundant regulated power supplies through said diode to said output node in accordance with the monitored voltage drop across said diode so as to enable said another of said redundant regulated power supplies to supply said regulated output voltage that is sufficient to meet the current demand of said load without an interruption in the supply of current to said load in the event of an inability of said one of said redundant regulated power supplies to supply a regulated output voltage that meets the current demand of said load; and wherein said monitor circuit comprises an operational amplifier circuit coupled to compare a voltage drop across said diode with a prescribed voltage reference and, in response to said voltage drop being less than said reference voltage, to supply a feedback control signal to said another of said redundant regulated power supplies that is effective increase its output voltage sufficiently to forward bias said diode, and wherein said operational amplifier circuit is further coupled to compare the voltage at the output port of said another of said redundant regulated power supplies with a further reference voltage and, in response to the voltage at the output port of said another of said redundant regulated power supplies exceeding said further reference voltage, to control said feedback signal so that the output voltage of said another of said redundant regulated power supplies is regulated in accordance with the voltage at said output node.

5. A circuit for monitoring the output of a regulated power supply comprising:

a diode coupled between the output of said regulated power supply and an output node adapted to be coupled to a load;

an operational amplifier circuit coupled to compare a voltage drop across said diode with a prescribed reference voltage and, in response to said voltage drop being less than said reference voltage, to supply a feedback control signal to said regulated power supply that is effective increase its output voltage sufficiently to forward bias said diode wherein said operational amplifier circuit is further coupled to compare the voltage at the output of said regulated power supply with a further reference voltage and, in response to the voltage at the output of said regulated power supply exceeding said further reference voltage, to control said feedback signal so that the output voltage of said regulated power supply is regulated in accordance with the voltage at said output node.

* * * * *